United States Patent [19]
Tran et al.

[11] Patent Number: 5,930,484
[45] Date of Patent: Jul. 27, 1999

[54] METHOD AND SYSTEM FOR INPUT/ OUTPUT CONTROL IN A MULTIPROCESSOR SYSTEM UTILIZING SIMULTANEOUS VARIABLE-WIDTH BUS ACCESS

[75] Inventors: Cang Ngoc Tran; James Allan Kahle, both of Austin, Tex.

[73] Assignee: International Business Machines Corporation, Armonk, N.Y.

[21] Appl. No.: 08/933,156

[22] Filed: Sep. 18, 1997

[51] Int. Cl.[6] .............................. G06F 13/14; G06F 13/00
[52] U.S. Cl. ............................................. 395/287; 395/841
[58] Field of Search .................................... 395/309, 827, 395/840, 841, 287, 311, 306

[56] References Cited

U.S. PATENT DOCUMENTS

| | | | |
|---|---|---|---|
| 4,085,448 | 4/1978 | Kogge ....................................... | 395/287 |
| 4,928,234 | 5/1990 | Kitamura et al. ........................ | 711/151 |
| 5,619,726 | 4/1997 | Seconi et al. ............................ | 395/842 |
| 5,778,206 | 7/1998 | Pain et al. ................................ | 395/309 |
| 5,822,553 | 10/1998 | Gifford et al. .......................... | 395/309 |

*Primary Examiner*—Gopal C. Ray
*Attorney, Agent, or Firm*—Anthony V. S. England; Andrew J. Dillon

[57] ABSTRACT

A method and system for input/output control in a multiprocessor system having multiprocessors coupled to a system memory via a common wide bus. The common wide bus is subdivided into multiple sub-buses which may be accessed individually or in groups by a selected processor, or individual sub-buses may be accessed by multiple processors simultaneously in response to one or more transfer requests. In response to a transfer request having a data address associated therewith, a particular target device is identified. The data address is then written into an address queue. Thereafter, one or more of the multiple sub-buses are utilized to transfer data to or from a single processor in response to a transfer request from a single processor. In response to a transfer request from multiple processors, one or more of the multiple sub-buses may be utilized separately to simultaneously transfer data to or from multiple processors.

11 Claims, 7 Drawing Sheets

METHOD AND SYSTEM FOR INPUT/OUTPUT CONTROL IN A MULTIPROCESSOR SYSTEM UTILIZING SIMULTANEOUS VARIABLE-WIDTH BUS ACCESS

BACKGROUND OF THE INVENTION

1. Field of the Invention

The present invention relates in general to an improved multiprocessor data processing system and, in particular, to an improved method and system for input/output control in a multiprocessor system. Still more particularly, the present invention relates to a method and system for input/output control of simultaneous variable-width bus access by multiple processors in a multiprocessing system.

2. Description of the Prior Art

A multiprocessing system is a computing system which employs two or more connected processing units which execute programs simultaneously. The objective of such systems is increased speed or computing power by the carrying out of multiple processes simultaneously within a single system.

In such systems, a number of substantially equal processors are often coupled together over a common bus to a system memory or other I/O devices. Sharing of the bus or the provision of multiple bus units is required in order to use most efficiently multiple processor assets.

In such systems, it is desirable to access data over the system bus with a minimum delay. Large data transfers may require large bandwidth on the system bus while other processes may need only a small amount of data. For example, an instruction cache miss may require quick access to a large amount of data or instruction stalls may result. Alternatively, a "test and set" operation may only require a byte or two of data.

The fact that processors may need to access either large or small amounts of data and the disparity in bus sizes between processors and selected peripheral devices has led to some development in variable-width buses. For example, U.S. Pat. No. 5,300,811 discloses an integrated circuit device which can vary the effective bit width of a data bus by means of software instructions. Thus, a microprocessor is provided which may access the external data bus utilizing a width of 8 bits, 16 bits, 32 bits, etc., by dynamic bus sizing.

U.S. Pat. No. 5,408,628 discloses a solid-state data recorder which employs a solid-state memory to record data in the form of data words of variable length which may be transmitted from the memory on a flexible-width data bus. Bus lines are selected from among the total number of bus lines in accordance with the mapped-out memory locations in order to transfer the variable-length data words to and from the memory in order to minimize loss of usable recording space in the memory.

U.S. Pat. No. 5,515,507 discloses a multiple-width data bus for a microsequencer bus controller system so that data may be transferred either as full words or half words in order to permit the processor to communicate with subsystems which may have different word sizes.

U.S. Pat. No. 5,423,009 also discloses a dynamic-sizing bus controller which may be utilized with a host device having a host bus of a predetermined physical bus width and a slave device having a slave bus of a variable one of multiple possible logical bus widths. Finally, U.S. Pat. No. 5,394,528 discloses a data processor having bus-sizing function which permits data access to occur based upon the variable size of the data to be transferred.

While many of these systems disclose a technique whereby the width of a bus may be dynamically altered, none of these systems is directed to the concept of addressing the variable data access requirements of multiple processors in a multiprocessor system.

It thus should be apparent that a need exists for an input/output system whereby bus arbitration between multiple processors in a multiprocessor system may be utilized to effectively and efficiently access data within the system by utilizing all or a portion of a common wide bus.

SUMMARY OF THE INVENTION

It is therefore one object of the present invention to provide an improved multiprocessor data-processing system.

It is another object of the present invention to provide an improved method and system for input/output control in a multiprocessor data-processing system.

It is yet another object of the present invention to provide an improved method and system for input/output control of simultaneous variable-width bus access by multiple processors in a multiprocessing system.

The foregoing objects are achieved as is now described. A method and system are provided for input/output control in a multiprocessor system having multiple processors coupled to a system memory via a common wide bus. The common wide bus is subdivided into multiple sub-buses which may be accessed individually or in groups by a selected processor, or individual sub-buses may be accessed by multiple processors simultaneously in response to one or more transfer requests. In response to a transfer request having a data address associated therewith, a particular target device is identified. The data address is then written into an address queue. Thereafter, one or more of the multiple sub-buses are utilized to transfer data to or from a single processor in response to a transfer request from a single processor. In response to a transfer request from multiple processors, one or more of the multiple sub-buses may be utilized separately to simultaneously transfer data to or from multiple processors.

The above, as well as additional objectives, features and advantages of the present invention, will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
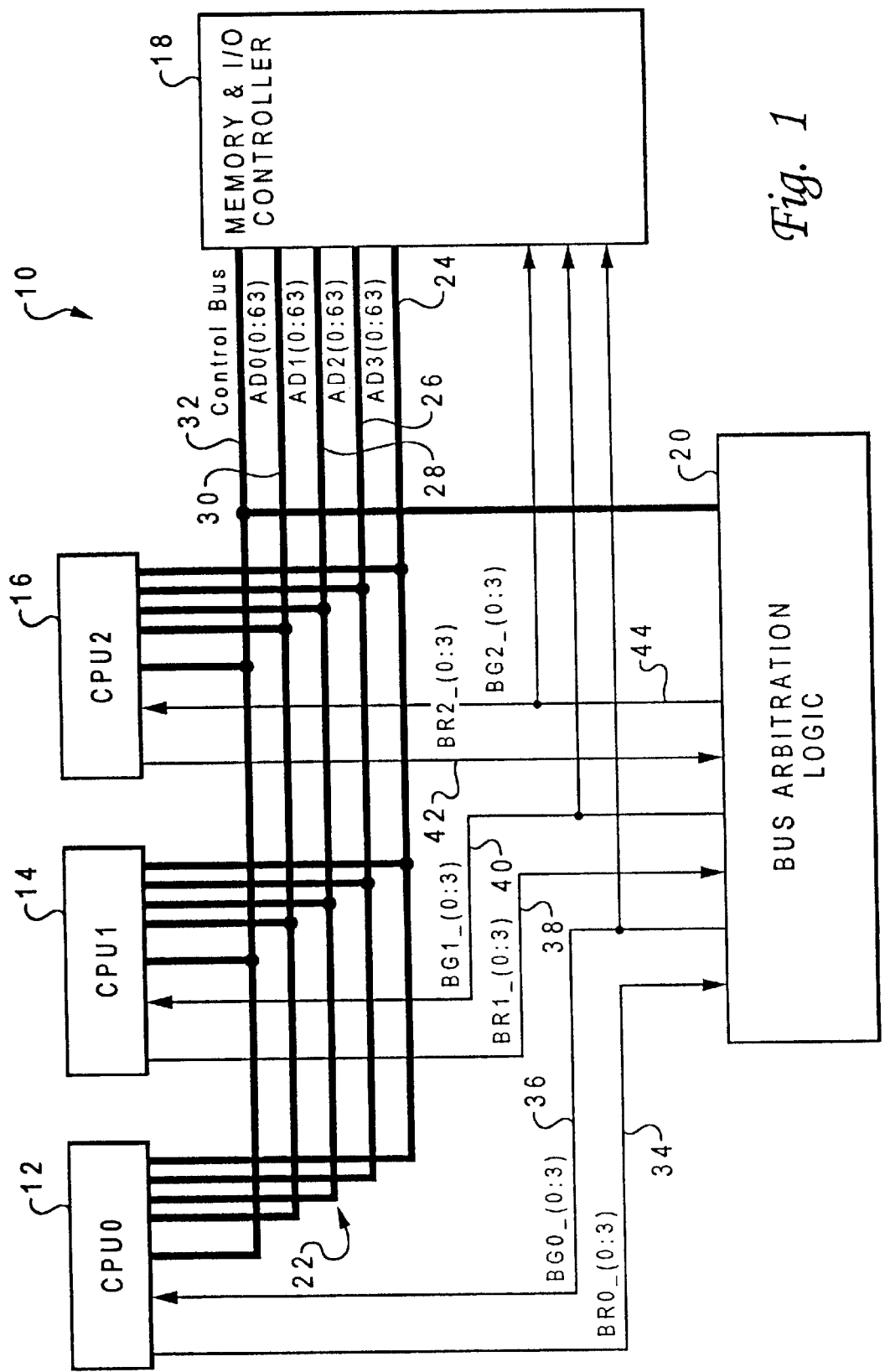
FIG. 1 is a high-level block diagram illustrating a multiprocessor system which may be implemented in accordance with the method and system of the present invention.

With reference now to the figures and, in particular, with reference to FIG. 1, there is depicted a high-level block diagram illustrating a multiprocessor system 10 which may be implemented in accordance with the method and system of the present invention. As depicted, multiprocessor system 10 includes a plurality of processors including CPU 12, CPU 14 and CPU 16. Each central processing unit is interconnected with memory and I/O controller 18 via a common wide bus 22. As depicted, common wide bus 22 is subdivided into sub-bus 24, sub-bus 26, sub-bus 28 and sub-bus 30. Additionally, control bus 32 forms a portion of common wide bus 22.

In a manner which will be explained in greater detail herein, bus arbitration logic 20 is coupled to CPU 12, CPU 14 and CPU 16 via bus request lines 34, 38 and 42, respectively, and bus grant lines 36, 40 and 44. In the depicted embodiment of the present invention, each sub-bus 24, 26, 28 and 30 comprises a 64-bit bus.

Figure 2:
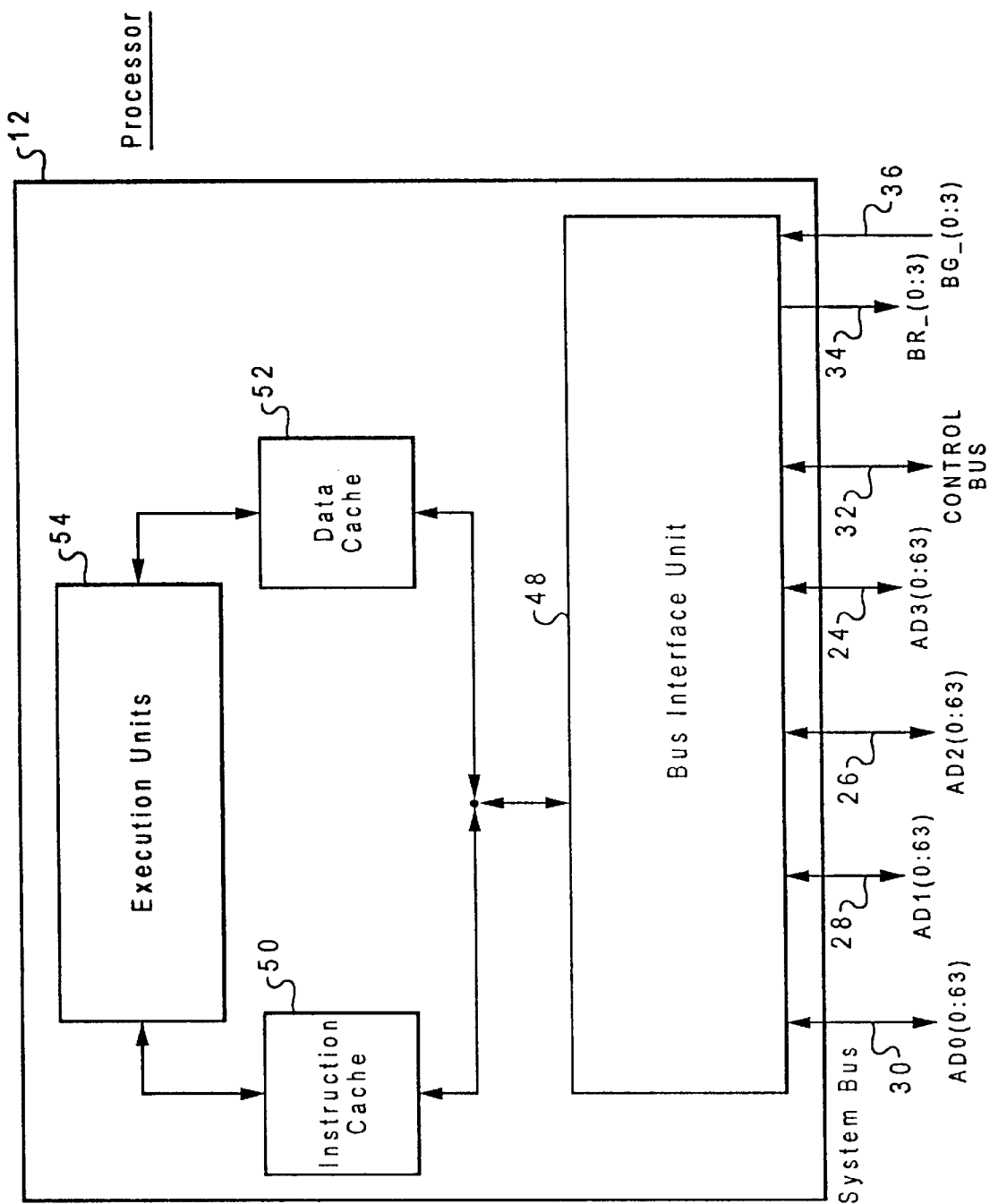
FIG. 2 is a high-level block diagram illustrating one processor of the multiprocessor system of FIG. 1.

Referring now to FIG. 2, there is depicted a high-level block diagram illustrating CPU 12 of FIG. 1. As illustrated, CPU 12 includes a bus interface unit 48 which is coupled to sub-bus 24, 26, 28, and 30. Additionally, bus interface unit 48 is coupled to control bus 32 and bus request line 34 and bus grant line 36.

Interposed between bus interface unit 48 and various execution units 54 which form part of central processing unit 12 are instruction cache 50 and data cache 52. The manner by which various instructions and data are stored within a cache and updated based upon usage information is well-known to those having ordinary skill in this art and forms no part of the present specification.

Figure 3:
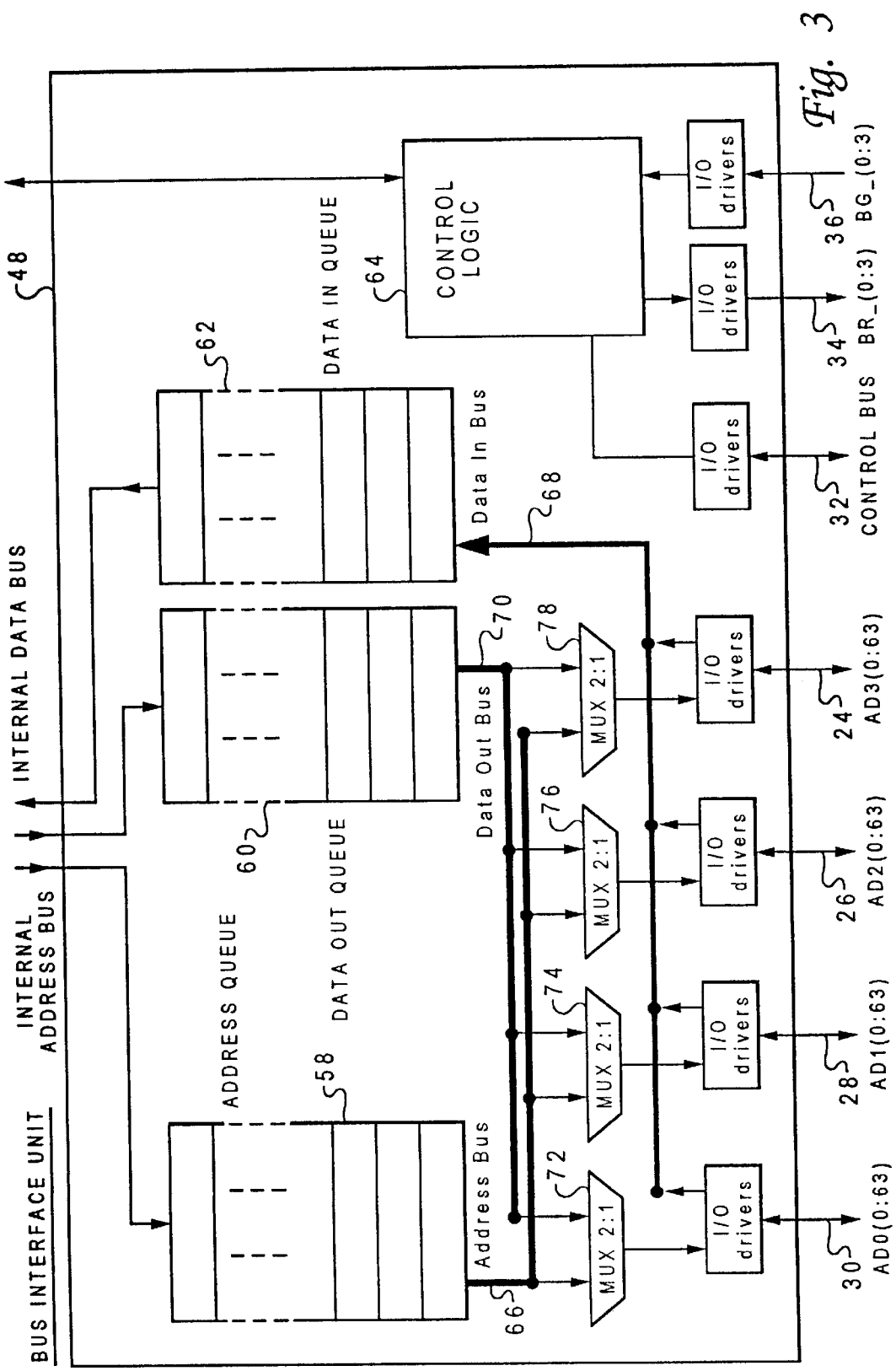
FIG. 3 is a high-level block diagram illustrating the bus interface unit of the processor of FIG. 2.

With reference now to FIG. 3, there is depicted a high-level block diagram which illustrates in greater detail bus interface unit 48 of FIG. 2. As depicted, each sub-bus 24, 27, 28 and 30 is coupled, via standard I/O drivers to a data-in bus 68. Data-in bus 68 is coupled to data-in queue 62. In the depicted embodiment of the present invention, thee are four separate sub-buses which form a portion of common wide bus 22 and, thus, as those skilled in the art will appreciate upon reference to the present disclosure, data-in queue 62 preferably includes a four-way multiplex such that data may be received within bus interface unit 48 over one, two, three or four sub-buses, either independently or simultaneously.

Address queue 58 and data-out queue 60 are also coupled to address bus 66 and data out-bus 70, respectively, and also include a four-way multiplex circuit which, as will be described in greater detail herein, permit bus interface unit 48 to selectively utilize one or more sub-buses of common wide bus 22.

Address bus 66 and data-out bus 70 are coupled to each sub-bus via a multiplex 72, 74, 76 and 78 such that either data or an address may be output to one or more of the sub-buses which form common wide bus 22.

Figure 4:
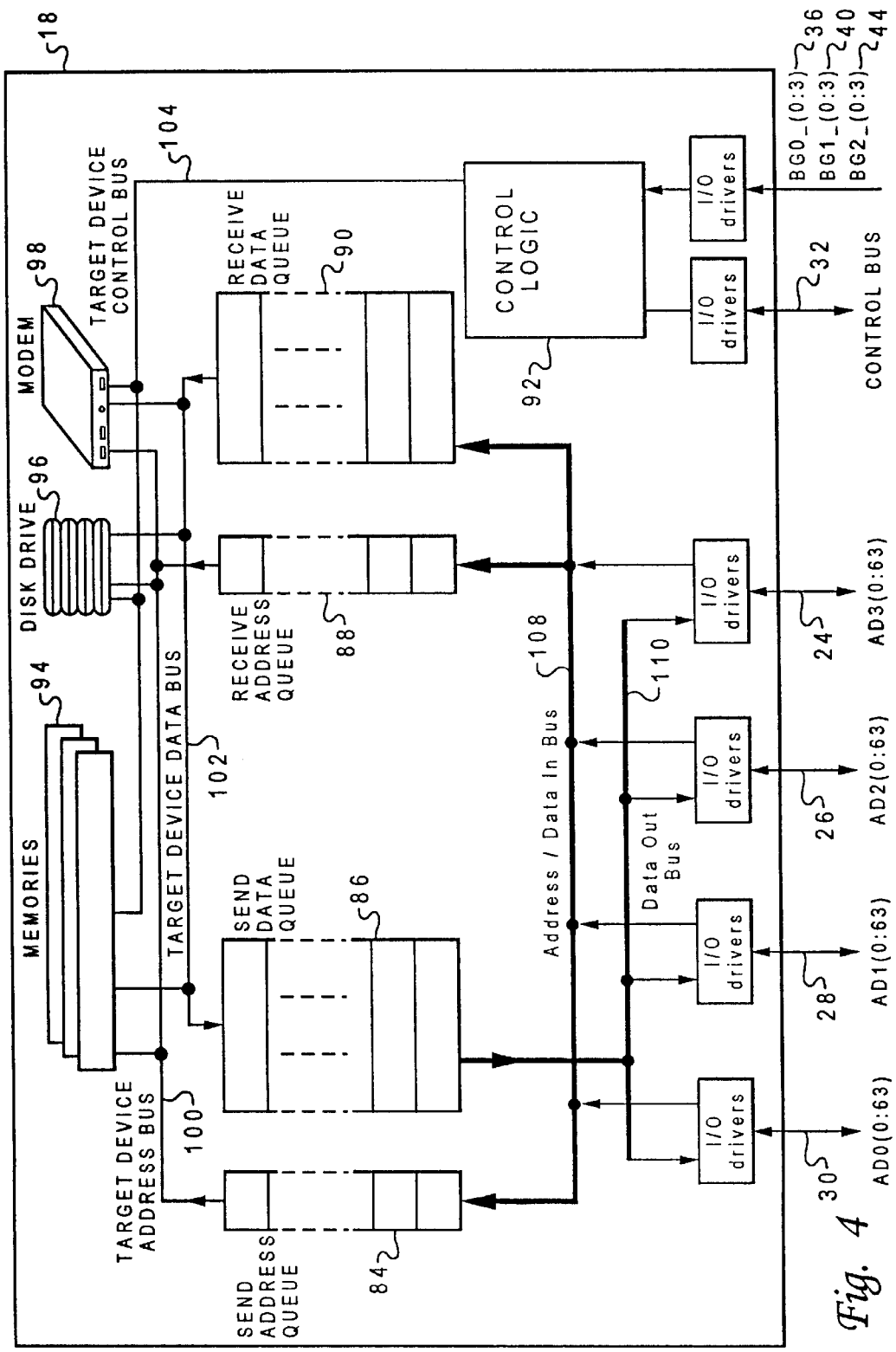
FIG. 4 is a high-level block diagram illustrating the memory and I/O controller of the multiprocessor system of FIG. 1.

Referring now to FIG. 4, there is depicted a high-level block diagram illustrating memory and I/O controller 18 of multiprocessor system 10, as depicted within FIG. 1. As depicted, memory and I/O controller 18 also is coupled to each sub-bus 24, 26, 28 and 30, as well as control bus 32, and each bus grant line 36, 40 and 44.

Memory and I/O controller 18 may be utilized to couple multiprocessor system 10 to various peripheral devices such as memories 94, disk drive 96 and modem 98. A target device address bus 100, data bus 102 and control bus 104 are utilized within memory and I/O controller 18 to selectively read data from or write data to one of the depicted peripheral devices under the control of control logic 92.

As described above with respect to each bus interface unit memory and I/O controller 18 also included is a plurality of queues including send address queue 84, receive address queue 88, send data queue 86 and receive data queue 90. As described above, each address or data queue preferably includes a four-way multiplex system in view of the fact that, in the depicted embodiment of the present invention, the common wide bus 22 is subdivided into four separate sub-buses, one or more of which may be utilized for a given transaction.

As depicted, address and data from one or more of the sub-buses may be coupled to an associated queue via address/data-bus 108 and data from the various peripheral devices may be coupled to one or more of the sub-buses via data-out bus 110.

Figure 5:
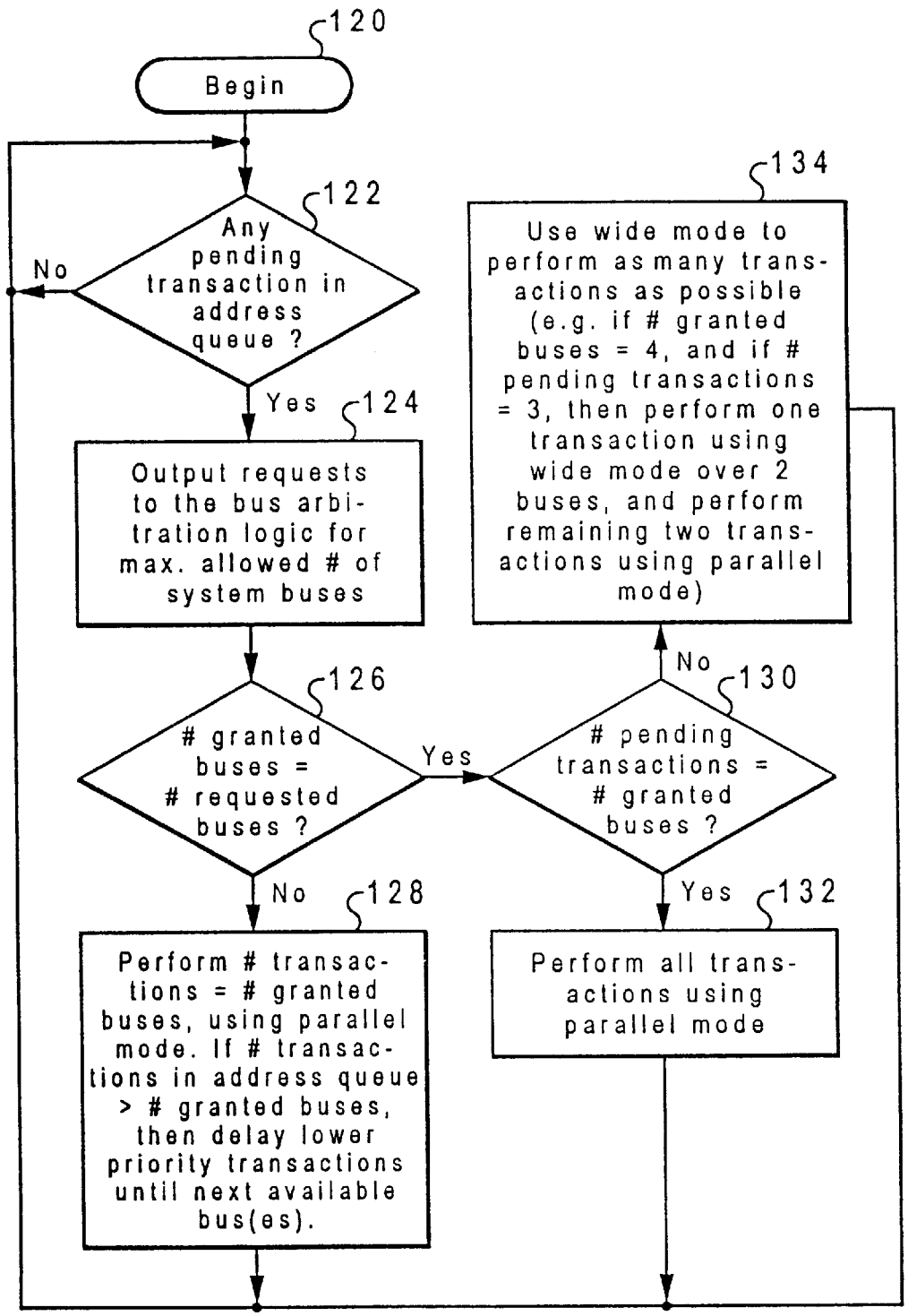
FIG. 5 is a high-level logic flowchart illustrating a control sequence for variable-width bus access by multiple processors in accordance with the method and system of the present invention.

Next, with reference to FIG. 5, there is depicted a high-level logic flowchart which illustrates a control sequence for variable-width bus access by multiple processors in accordance with the method and system of the present invention. As depicted in FIG. 1, multiple processors form part of multiprocessor system 10, and the process depicted in FIG. 5 may be implemented based upon the action of any one processor within multiprocessor system 10.

As illustrated, the process begins at block 120 and thereafter passes to block 122. Block 122 depicts a determination of whether or not any pending transactions are present in the address queue of a bus interface unit for a selected processor. If not, the process merely iterates until such time as a pending transaction is present within an associated address queue.

Still referring to block 122, in the event pending transactions are present within the address queue of a processor, the processor passes to block 124. Block 124 illustrates an output request to bus arbitration logic 20 (see FIG. 1) for the maximum number of allowed system sub-buses. This request is reviewed by bus arbitration logic 20 and, in accordance with the desired prioritization scheme, one or more of sub-buses 24, 26, 28 and 30 may be granted to the requesting processor.

Referring now to block 126, a determination is made as to whether or not the number of granted buses is equal to the number of requested buses. If not the process passes to block 128. Block 128 depicts the performance of a number of transactions in parallel utilizing more than one sub-bus. If the number of transactions pending within the address queue of the selected processor is greater than the number of granted buses, lower-priority transactions will be delayed until the next available bus has been granted. Thereafter, the process returns to block 122 in an iterative fashion.

Still referring to block 126, in the event the number of granted sub-buses is equal to the number of requested sub-buses, the process passes to block 130. Block 130 illustrates a determination of whether or not the number of pending transactions within the address queue of a particular processor is equal to the number of granted buses, and if so, the process passes to block 132. Block 132 illustrates the performance of all transactions in parallel wherein each transaction utilizes a separate sub-bus of common wide bus 22. The process then returns to block 122, in an iterative fashion.

Still referring to block 130, in the event the number of pending transactions is not equal to the number of granted buses, the process passes to block 134. Block 134 illustrates the use of a so-called "wide" mode to perform as many transactions as possible. That is, if the number of granted sub-buses is equal to four and only three transactions are pending, then one transaction will be performed utilizing two separate sub-buses in a so-called "wide" mode, and the remaining transactions will be performed separately, each transaction utilizing a single sub-bus. Thereafter, the process returns to block 122 in an iterative fashion.

Figure 6:
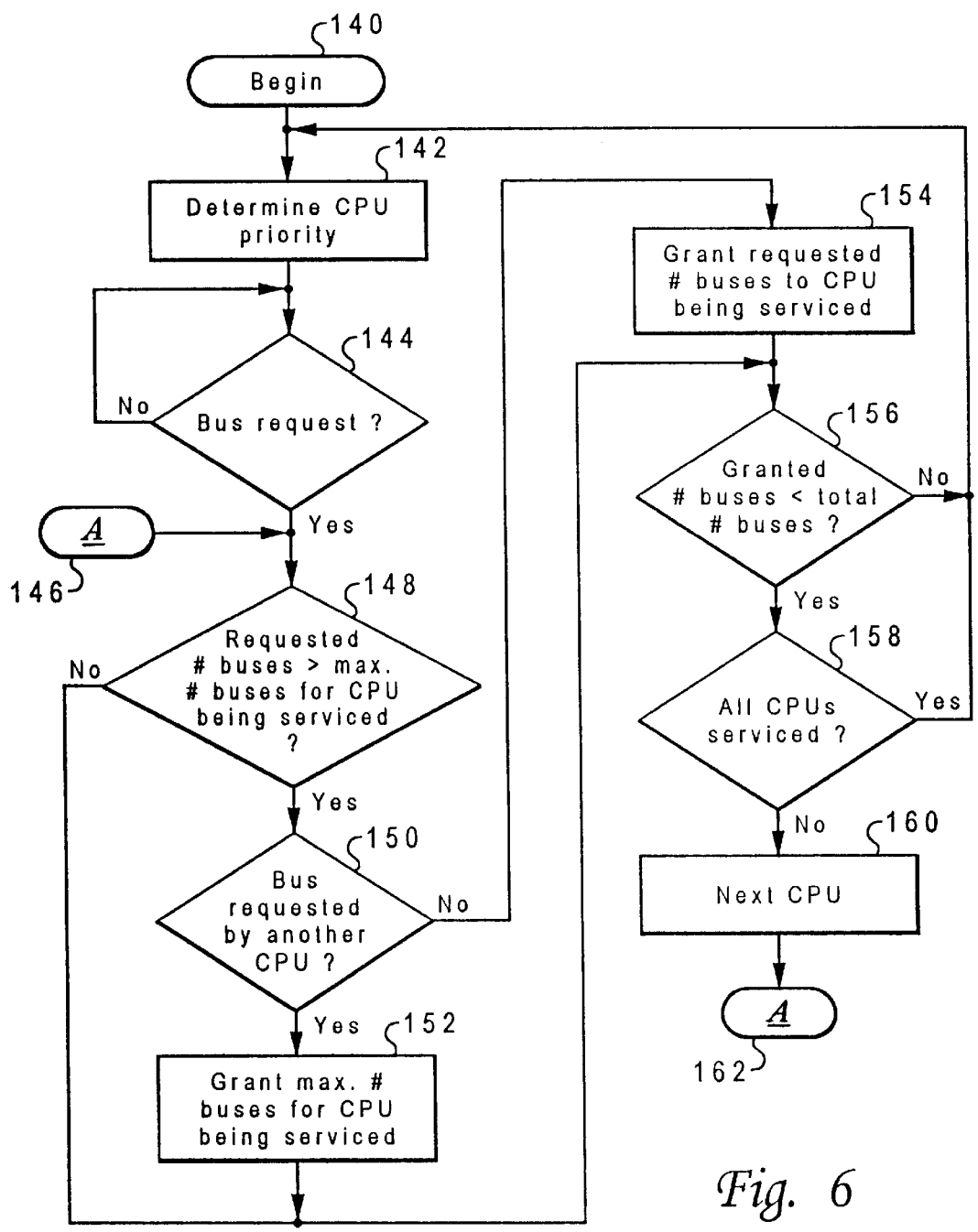
FIG. 6 is a high-level logic flowchart illustrating a control sequence for variable-width bus arbitration in accordance with the method and system of the present invention.

Referring now to FIG. 6, there is depicted a high-level logic flowchart illustrating a control sequence for variable-width bus arbitration in accordance with the method and system of the present invention. As depicted, this process begins at block 140 and thereafter passes to block 142. Block 142 depicts a determination of the priority of each central processing unit within multiprocessor system 10. Next, the process passes to block 144.

Block 144 illustrates a determination of whether or not a bus request has been detected on an associated bus request line from one or more of the processing units within multiprocessor system 10. If not, the process merely iterates until the occurrence of a bus request.

Still referring to block 144, in the event a bus request has occurred, the process passes to block 148. Block 148 depicts a determination of whether or not the requested number of buses is greater than the maximum number of buses for the processing unit originating the request. If so, the process passes to block 150. Block 150 illustrates a determination of whether or not a bus request is present from another processing unit within multiprocessing system 10. If another bus request is present, the process passes to block 152. Block 152 illustrates the granting of the maximum number of buses specified for the processing unit being serviced presently.

Returning to block 148, in the event the number of requested buses is not greater than the maximum number of buses for the processing unit being serviced, the process passes to block 156. Block 156 depicts a determination of whether or not the granted number of buses is less than the total number of sub-buses within the system. If not, the process returns to block 142 to determine the next processor priority and grant access to another sub-bus.

Referring again to block 150, in the event the number of buses requested is greater than the maximum number of buses permitted for the processor being serviced and a bus has not been requested by another processing unit, the process passes to block 154. Block 154 depicts the granting of the requested number of buses to the processor being serviced.

Referring to block 156, in the event the number of sub-buses granted is less than the total number of sub-buses within the system, the process passes to block 158. Block 158 depicts a determination of whether or not all processors within multiprocessor system 10 have been serviced and, if so, the process returns to block 142 to await a bus request from another processor. Alternatively, in the event all processors have not been serviced, the process passes to block 160. Block 160 illustrates the selection of the next processor for service, and the process then returns, via connectors 162 and 146, in an iterative fashion, to analyze the request for buses as described above.

Upon reference to the foregoing, those skilled in the art will appreciate that, by utilizing the bus arbitration logic system described herein, multiple processors in a multiprocessor system which are coupled to a system memory via a common wide bus which has been subdivided into sub-buses, in the manner described herein, may, in accordance with a predetermined priority scheme, access system memory utilizing one or more sub-buses, and multiple processor units may simultaneously access system memory utilizing multiple sub-buses.

Figure 7:
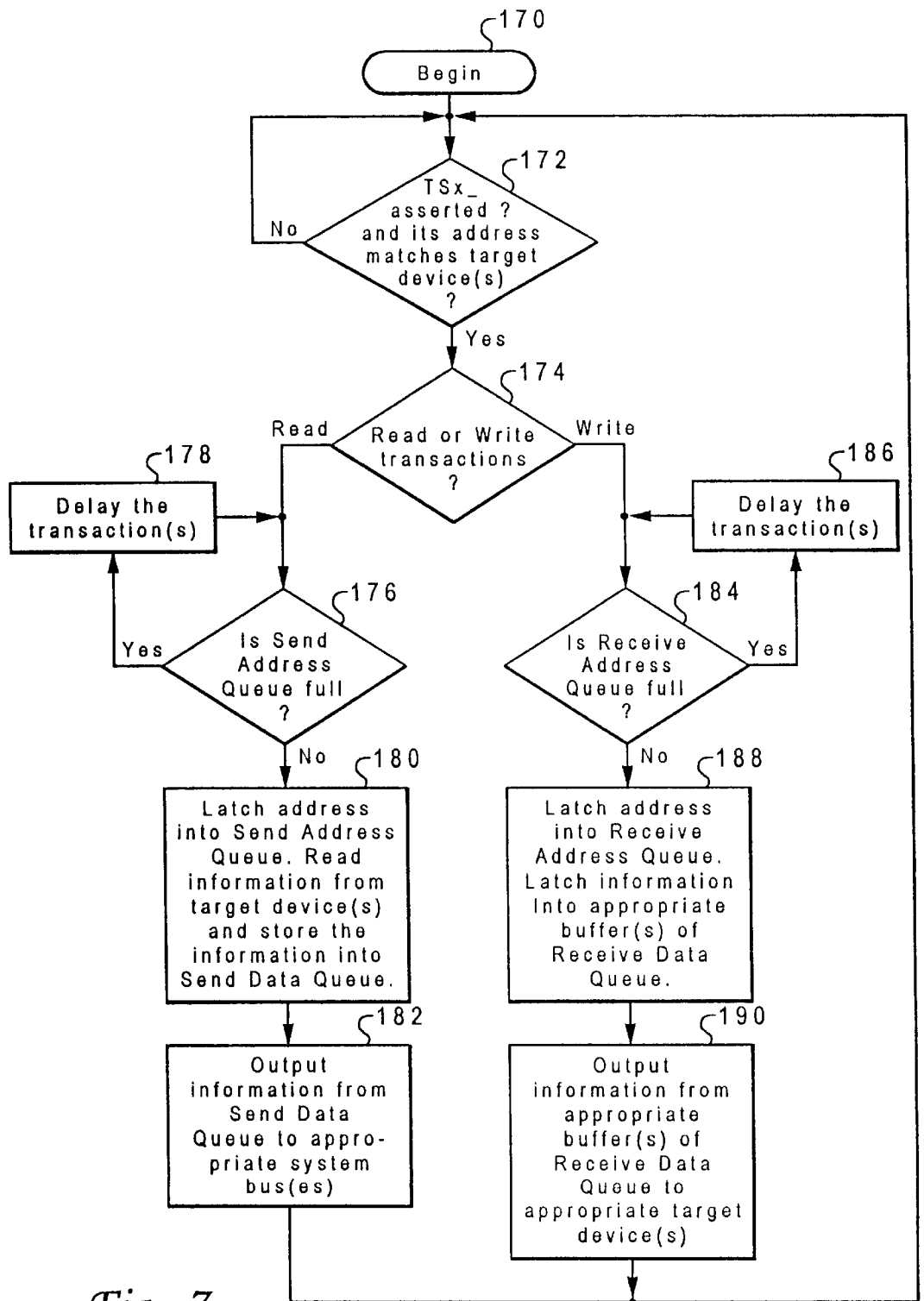
FIG. 7 is a high-level logic flowchart illustrating a control sequence for memory and/or I/O device variable-width bus access in accordance with the method and system of the present invention.

Finally, with reference to FIG. 7, there is depicted a high-level logic flowchart illustrating a control sequence for memory and/or I/O device variable-width bus access in accordance with the method and system of the present invention. As depicted, this process begins at block 170 and thereafter passes to block 172. Block 172 depicts a determination of whether or not a transfer start has been asserted and the address for the transfer matches the address of one or more target devices. If not, the process returns, in an iterative fashion, to await the assertion of a transfer start. Still referring to block 172, in the event a transfer start has been asserted, and the address matches a target device, the process passes to block 174. Block 174 depicts a determination of whether the transfer is a read or write transaction. Still referring to block 174, in the event the transaction is a read transaction, the process passes to block 176. Block 176 illustrates a determination of whether the send-address queue is full, and if so, the process passes to block 178 which illustrates the delaying of the transaction.

Alternatively, in the event the send-address queue is not full, the process passes to block 180. Block 180 depicts the latching of the send-address into the send-address queue, the reading of information from the target device or devices and the storing of that information within the send-data queue. Thereafter, the process passes to block 182. Block 182 illustrates the output of the information from the send-data queue via one or more of the system sub-buses in the manner described above. The process then returns to block 172 in an iterative fashion.

Referring again to block 174, in the event the transfer start is a write transaction, the process passes to block 184. Block 184 illustrates a determination of whether or not the receive-address queue is full, and if so, the process passes to block 186, in a manner similar to that described above, so that the transaction may be delayed until such time as the receive-address queue is no longer full.

Still referring to block 184, in the event the receive-address queue is not full, the process passes to block 188. Block 188 illustrates the latching of the receive-address into the receive-address queue and the latching of information into the appropriate buffers of the receive-data queue. Thereafter, the process passes to block 190. Block 190 illustrates the outputting of information from the appropriate buffers of the receive-data queue to the appropriate target devices as described above.

Upon reference to the foregoing, those skilled in the art will appreciate that the applicants herein named have provided a technique whereby data transfers within a multiprocessor system may be achieved with a higher degree of efficiency by utilizing a common wide bus which has been subdivided into multiple sub-buses and accessed via arbitration such that the width of bus utilized by a particular transaction may be efficiently varied so that data transfers may occur utilizing the most efficient bus width for transfer and so that multiple processors may simultaneously access system memory utilizing separate portions of the common wide bus.

We claim:

1. An input/output control method for a multiprocessor system having a plurality of processors and a common wide bus subdivided into a plurality of sub-buses, said method comprising the steps of:

matching a target device and one or more of said plurality of processors, in response to a transfer request by one or more of said plurality of processors;

simultaneously utilizing one or more of said plurality of sub-buses to transfer data to or from a particular processor among said plurality of processors in response to a transfer request from said particular processor; and simultaneously utilizing one or more of said plurality of sub-buses to transfer data to or from each of multiple ones of said plurality of processors simultaneously in response to transfer requests by multiple ones of said plurality of processors.

2. The input/output control method according to claim 1, further including the step of associating an address for desired data with each transfer request.

3. The input/output control method according to claim 2, wherein multiprocessor system includes a plurality of target devices and wherein said method further includes the step of utilizing said address for desired data associated with each transfer request to identify a particular target device among said plurality of said target devices.

4. The input/output control method according to claim 3, further including the step of writing said address for desired data into an address queue.

5. The input/output control method according to claim 4, further including the step of delaying a transfer to or from one or more said plurality of processors in response to an indication that said address queue is full.

6. An input/output control system for a multiprocessor system having a plurality of processors and a common wide bus subdivided into a plurality of sub-buses, said system comprising:

means for matching a target device and one or more of said plurality of processors, in response to a transfer request by one or more of said plurality of processors;

means for simultaneously utilizing one or more of said plurality of sub-buses to transfer data to or from a particular processor among said plurality of processors in response to a transfer request from said particular processor; and means for simultaneously utilizing one or more of said plurality of sub-buses to transfer data to or from each of multiple ones of said plurality of processors simultaneously in response to transfer requests by multiple ones of said plurality of processors.

7. The input/output control system according to claim 6, further including means for associating an address for desired data with each transfer request.

8. The input/output control system according to claim 6, wherein said multiprocessor system includes a plurality of target devices and wherein said system further includes means for utilizing said address for desired data associated with each transfer request to identify a particular target device among said plurality of target devices.

9. The input/output control system according to claim 8, wherein one of said plurality of target devices comprises a memory.

10. The input/output control system according to claim 8, wherein one of said plurality of target devices comprises a disk drive.

11. The input/output control system according to claim 8, wherein one of said plurality of target devices comprises a modem.

* * * * *